United States Patent
Kawanami

(10) Patent No.: US 7,903,154 B2
(45) Date of Patent: Mar. 8, 2011

(54) OPTICAL APPARATUS HAVING CONTROL UNIT CONFIGURED TO REDUCE NOISE IN CAPTURED IMAGE

(75) Inventor: Akihiro Kawanami, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 527 days.

(21) Appl. No.: 12/054,222

(22) Filed: Mar. 24, 2008

(65) Prior Publication Data

US 2008/0252751 A1 Oct. 16, 2008

(30) Foreign Application Priority Data

Apr. 13, 2007 (JP) ................ 2007-105453

(51) Int. Cl.
- *H04N 5/217* (2006.01)
- *H04N 5/235* (2006.01)
- *H04N 5/225* (2006.01)
- *G03B 7/00* (2006.01)
- *G03B 3/10* (2006.01)
- *G03B 13/34* (2006.01)
- *G03B 7/26* (2006.01)

(52) U.S. Cl. ......... 348/241; 348/362; 348/372; 396/135; 396/303

(58) Field of Classification Search ............ 348/208.12, 348/208.16, 229.1, 241, 248, 255, 362, 372; 396/135–6, 303
See application file for complete search history.

(56) References Cited

U.S. PATENT DOCUMENTS

2004/0027469 A1* 2/2004 Tsuruoka ................ 348/241

FOREIGN PATENT DOCUMENTS

| JP | 2004-247872 A | 9/2004 |
| JP | 2005-292740 A | 10/2005 |

* cited by examiner

*Primary Examiner* — Sinh Tran
*Assistant Examiner* — Daniel M Pasiewicz
(74) *Attorney, Agent, or Firm* — Canon U.S.A., Inc. I.P. Division

(57) ABSTRACT

An optical apparatus includes a control unit configured to perform control to change power consumed by a lens unit or operation state of an actuator of the lens unit during processing of an image signal obtained from an image pickup element according to a noise tolerance of a camera and a set state of the camera, such as an ISO speed rating.

10 Claims, 7 Drawing Sheets

| PRODUCT A | NOISE TOLERANCE | ISO SPEED RATING | POWER CONSUMPTION | SPEED |
|---|---|---|---|---|
| | 100 | 50 | UP TO 5 W | NO LIMIT |
| | | 100 | UP TO 5 W | NO LIMIT |
| | | 200 | UP TO 4 W | 50 rpm |
| | | 400 | UP TO 4 W | 50 rpm |
| | | 800 | UP TO 3 W | 40 rpm |
| | | 1600 | UP TO 2 W | 30 rpm |
| | | 3200 | UP TO 1 W | 20 rpm |
| | | 6400 | CONSUMPTION PROHIBITED | STOP ROTATION |

| PRODUCT B | NOISE TOLERANCE | ISO SPEED RATING | POWER CONSUMPTION | SPEED |
|---|---|---|---|---|
| | 80 | 50 | UP TO 5 W | NO LIMIT |
| | | 100 | UP TO 4 W | 50 rpm |
| | | 200 | UP TO 4 W | 50 rpm |
| | | 400 | UP TO 3 W | 40 rpm |
| | | 800 | UP TO 2 W | 30 rpm |
| | | 1600 | UP TO 1 W | 20 rpm |
| | | 3200 | CONSUMPTION PROHIBITED | STOP ROTATION |
| | | 6400 | CONSUMPTION PROHIBITED | STOP ROTATION |

FIG. 2

| PRODUCT A | NOISE TOLERANCE | ISO SPEED RATING | POWER CONSUMPTION | SPEED |
|---|---|---|---|---|
| | 100 | 50 | UP TO 5 W | NO LIMIT |
| | | 100 | UP TO 5 W | NO LIMIT |
| | | 200 | UP TO 4 W | 50 rpm |
| | | 400 | UP TO 4 W | 50 rpm |
| | | 800 | UP TO 3 W | 40 rpm |
| | | 1600 | UP TO 2 W | 30 rpm |
| | | 3200 | UP TO 1 W | 20 rpm |
| | | 6400 | CONSUMPTION PROHIBITED | STOP ROTATION |

| PRODUCT B | NOISE TOLERANCE | ISO SPEED RATING | POWER CONSUMPTION | SPEED |
|---|---|---|---|---|
| | 80 | 50 | UP TO 5 W | NO LIMIT |
| | | 100 | UP TO 4 W | 50 rpm |
| | | 200 | UP TO 4 W | 50 rpm |
| | | 400 | UP TO 3 W | 40 rpm |
| | | 800 | UP TO 2 W | 30 rpm |
| | | 1600 | UP TO 1 W | 20 rpm |
| | | 3200 | CONSUMPTION PROHIBITED | STOP ROTATION |
| | | 6400 | CONSUMPTION PROHIBITED | STOP ROTATION |

| CAMERA STATUS | COMMUNICATION DATA |
|---|---|
| MAIN POWER OFF | 00hex |
| RELEASE IN PROGRESS | 10hex |
| AD CONVERSION IN PROGRESS | 11hex |
| DATA TRANSFER IN PROGRESS | 12hex |

OPTICAL APPARATUS HAVING CONTROL UNIT CONFIGURED TO REDUCE NOISE IN CAPTURED IMAGE

BACKGROUND OF THE INVENTION

1. Field of the Invention

The present invention relates to an optical apparatus, such as a camera, a lens unit, or an interchangeable-lens camera system, having a correction function to increase a gain (hereinafter referred to as an "ISO (International Organization for Standardization) speed rating") of a camera to compensate for problems such as a dark object and insufficient light available.

The present invention further relates to a camera apparatus which prevents an increase in noise caused by an increase in a gain of the optical apparatus.

2. Description of the Related Art

In general, an amplification gain is increased for an input signal which is small in amplitude to process an analog signal. A simple amplification also causes amplification of noise components. An amplified noise component is superimposed on a true signal component, and it is therefore difficult to extract a signal component having a high signal-to-noise (S/N) ratio.

The same problem arises for image information obtained by recent digital cameras. Japanese Patent Laid-Open No. 2004-247872 discloses an apparatus adapted to reduce noise in image data. In the disclosed apparatus, since setting the ISO speed rating high causes an increase in noise components in a photographed image, a correction value for reducing noise is changed according to the set ISO speed rating.

To solve problems other than noise for image data, Japanese Patent Laid-Open No. 2005-292740 discloses a device for automatically changing an ISO speed rating in a camera having a plurality of shooting modes.

Japanese Patent Laid-Open No. 2005-292740 focuses on prevention of camera shake. In a shooting mode in which camera shake may occur, the ISO speed rating is set high to prevent camera shake.

In the technique disclosed in Japanese Patent Laid-Open No. 2004-247872, however, if an image is captured in an environment with a lot of noise, in the image, signal components are not sufficiently distinguished from noise components. Thus, the noise components may be superimposed on the photographed image.

In the technique disclosed in Japanese Patent Laid-Open No. 2005-292740, due to the high priority placed on camera shake prevention, the ISO speed rating may be set too high and noise may be superimposed over the entirety of a photographed image.

To avoid this situation, as disclosed in Japanese Patent Laid-Open No. 2005-292740, an upper limit of ISO speed rating is set, and a photographer's technical level is entered.

However, it is difficult to select a technical level because it differs from one individual to another. Further, an incorrect entry of the setting or a failure to change the setting causes an inevitable increase in noise. One of the reasons a noise component may be superimposed on image data is the existence of external noise entering an image pickup element, such as magnetic noise, radio-frequency noise, or electrostatic noise, or the existence of power supply line noise or signal line noise supplied to an image pickup element or peripheral integrated circuits (ICs).

For example, when a motor located near an image pickup element is activated during photoelectric conversion of the image pickup element, magnetic noise is generated by the motor and current ripple noise is generated by power supply to activate the motor. Such magnetic noise and current ripple noise may influence the photoelectric conversion result. Consequently, a noise component is superimposed on the photographed image.

If an image pickup element of a camera receives a small amount of light reflected from an object, the number of noise components becomes larger than the number of signal components. In other words, the S/N ratio is low. To obtain a bright image, the ISO speed rating is set high.

By setting the ISO speed rating high, an entirely bright image is obtained. However, the noise components are also amplified accordingly, resulting in a noise-dispersed image.

In a situation where an image is captured with a high ISO speed rating or information concerning such an image is handled, it is desirable to reduce noise components.

SUMMARY OF THE INVENTION

The present invention provides an optical apparatus in which noise can be reduced even if an ISO speed rating is increased.

In an aspect of the present invention, an optical apparatus includes an image pickup unit including an image pickup element, the image pickup unit configured to obtain a photoelectrically converted output corresponding to an object image formed on an image pickup surface of the image pickup element. The optical apparatus includes an exposure time control unit configured to control an exposure time of the image pickup element, a sensitivity adjustment function unit configured to set an ISO speed rating value of the image pickup element, the ISO speed rating value corresponding to an amplification factor of the photoelectrically converted output, a lens unit including a plurality of elements to be electrically driven and configured to form the object image on the surface of the image pickup element, and a control changing unit configured to change the plurality of electrical elements of the lens unit, wherein when the image pickup unit is performing photoelectrical conversion or is processing photoelectrically converted data, a method of controlling at least one of the elements of the lens unit is changed so as to reduce power consumption according to the ISO speed rating value set by the sensitivity adjustment function unit.

In another aspect of the present invention, an optical apparatus includes an image pickup unit configured to obtain a photoelectrically converted output corresponding to an object image formed on a surface of an image pickup element, an exposure time control unit configured to control an exposure time of the image pickup element, a sensitivity adjustment function unit configured to set an ISO speed rating value corresponding to an amplification factor of the photoelectrically converted output obtained by the image pickup unit, a storage unit configured to store noise tolerance data indicating strength against external noise, a lens unit including a plurality of elements to be electrically driven and configured to form the object image on the surface of the image pickup element, and a communication unit configured to communicate with the lens unit to transmit information to the lens unit, the information including the ISO speed rating value set by the sensitivity adjustment function unit, an output value of the exposure time control unit, and the noise tolerance data, wherein the lens unit includes a changing unit configured to change a method of controlling the lens unit on the basis of the information received by the lens unit.

In an optical apparatus according to the present invention, a control method for reducing external noise or line noise incoming during a photographing operation of a camera allows flexible setting of an ISO speed rating regardless of the effect of such noise on an image pickup element depending on a lens state or type.

Further features of the present invention will become apparent from the following description of exemplary embodiments with reference to the attached drawings.

BRIEF DESCRIPTION OF THE DRAWINGS

FIG. 2 is an example operation control table of lenses, according to an exemplary aspect of the present invention.

DESCRIPTION OF THE EMBODIMENTS

Exemplary embodiments of the present invention will be described in detail with reference to the drawings.

Figure 1:
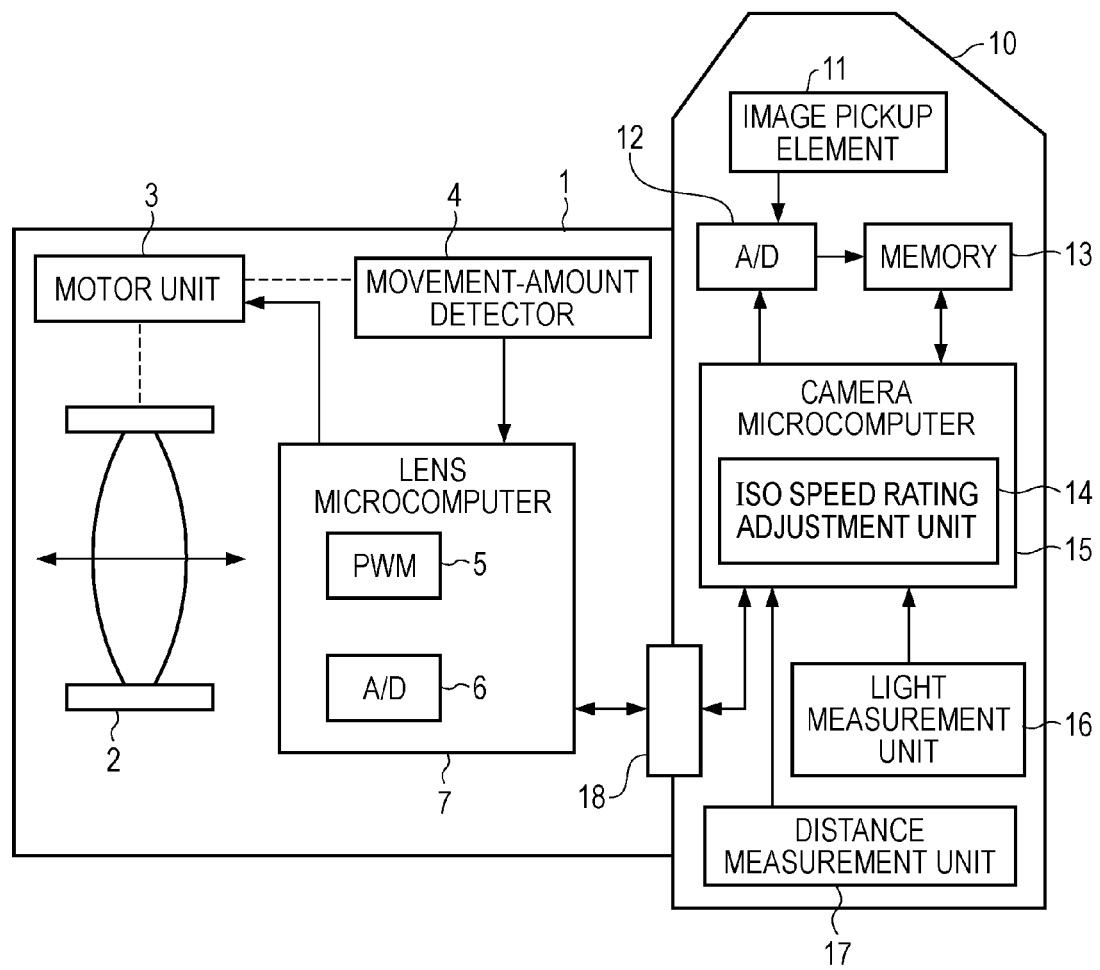
FIG. 1 is an internal block circuit diagram of a an example camera body and an interchangeable lens, according to an exemplary aspect of the present invention.

FIG. 1 is a block circuit diagram of an example autofocus single lens reflex (SLR) camera and an interchangeable lens therefor according to an embodiment of the present invention.

A lens unit of an autofocus interchangeable lens 1 is mounted on a camera body 10. The interchangeable lens 1 includes a focusing unit 2 having a focus lens, and the focus lens is movable in a light axis direction and is operable to focus on an object.

The focusing unit 2 is driven by a motor unit 3 serving as a drive source to move in the light axis direction. An output terminal of the motor unit 3 is connected to a movement-amount detector 4.

A drive terminal of the motor unit 3 and an output terminal of the movement-amount detector 4 are connected to a lens microcomputer 7. The lens microcomputer 7 includes a pulse width modulation (PWM) generation circuit 5, and a central processing unit (CPU) including an analog-to-digital (A/D) converter 6.

One gear in the motor unit 3 is connected to a circular pulse plate whose circumference is magnetized. As a motor of the motor unit 3 rotates, the pulse plate also rotates. The rotation of the pulse plate within the motor unit 3 is detected by the movement-amount detector 4, which is provided with an element adapted to read an intensity of a magnetic field, called a magneto-resistive (MR) element, and is read by the lens microcomputer 7.

This pulse output is equal to the amount of movement of the focusing unit 2. Alternatively, a pulse interval may be read to detect a moving speed of the focusing unit 2.

The movement-amount detector 4 may include, instead of an MR element, a photoelectric element such as a photo-interrupter or a photo-reflector.

The lens microcomputer 7 controls the elements within the interchangeable lens 1, and includes a general-purpose input/output (I/O) port, a serial communication function, a timer counter function, a digital-to-analog (D/A) conversion function, and a function for inputting a plurality of interrupts via an external terminal.

A voltage is applied to the motor of the motor unit 3 at constant intervals. The PWM generation circuit 5 is used to control a period of time during which the voltage applied at the constant intervals is turned on and a period of time during which the voltage applied at the constant intervals is turned off to control the rotation speed of the motor.

The A/D converter 6 is used to convert an analog voltage into digital information to monitor a power supply voltage supplied from the camera body 10.

The camera body 10 includes an image pickup element 11 formed of an charge coupled device (CCD) sensor on which an object image is formed by the focusing unit 2 of the interchangeable lens 1. An output signal of the image pickup element 11 is converted into a digital signal by an A/D converter 12, and is transmitted to a memory 13.

A camera microcomputer 15 including a CPU with an ISO speed rating adjustment function unit 14 is connected to the A/D converter 12, the memory 13, a light measurement unit 16, and a distance measurement unit 17. The camera microcomputer 15 and the lens microcomputer 7 of the interchangeable lens 1 are connected via a contact unit 18.

The contact unit 18 is provided with a plurality of metal projections on the side of the camera body 10, and has metal contacts embedded therein on the side of the interchangeable lens 1 so as to be brought into contact with the projections. The projections on the side of the camera body 10 are connected to a power supply terminal, a ground (GND) terminal, a communication input terminal, a communication output terminal, a synchronization clock terminals, and other terminals.

When the interchangeable lens 1 is attached to the camera body 10, communication is established between the camera body 10 and the interchangeable lens 1 via synchronous serial communication. Then, the lens microcomputer 7 receives power supply from the camera body 10 via the contacts of the contact unit 18.

The image pickup element 11 converts an optical image formed by light reflected from the object, which is gathered by the focusing unit 2 of the interchangeable lens 1, into an electrical signal.

The A/D converter 12 converts the analog signal of the image pickup element 11 into a digital signal. The memory 13 stores video data output from the A/D converter 12.

The camera microcomputer 15 controls the elements within the camera body 10 to communicate with the lens microcomputer 7 or determine the amount by which the focusing unit 2 is to move on the basis of an output value of the distance measurement unit 17.

The ISO speed rating adjustment function unit 14 is implemented within the camera microcomputer 15, and is mainly used to automatically determine an ISO speed rating. The light measurement unit (auto-exposure (AE)) 16 measures the amount of light received from the object. In response to a signal from the light measurement unit 16, the camera microcomputer 15 determines a shutter speed or a value of an aperture unit located in the interchangeable lens 1. Further, the ISO speed rating adjustment function unit 14 determines an ISO speed rating on the basis of an output value of the light measurement unit 16.

The distance measurement unit (autofocus (AF)) 17 is used for an autofocus operation of the camera. The distance measurement unit 17 determines an amount of defocus to the object. The amount of defocus is often detected using a phase difference detection method, which is the current mainstream detection method for autofocus. However, the amount of defocus may be detected using any other detection method.

The camera body 10 is provided with a switch (not shown) (hereinafter also referred to as a "release button"). The switch is pressed in different ways to provide different operations of the camera body 10. For example, the switch is pressed down a half stroke (hereinafter referred to as a "stroke S1") to start AF and AE operations. The switch is pressed down a full stroke (hereinafter referred to as a "stroke S2") to start a release operation in addition to AF and AE operations.

When the switch is operated by the stroke S1, the camera microcomputer 15 activates the distance measurement unit 17 and the light measurement unit 16.

The distance measurement unit 17 accumulates the light received by an internal AF sensor thereof to bring focus onto the object. When the accumulation is completed, the distance measurement unit 17 outputs a detection result to the camera microcomputer 15. The camera microcomputer 15 calculates the amount of defocus of the object image from a focal point on the basis of the detection result to calculate the amount by which the focusing unit 2 is to move.

This calculation operation is performed using lens information such as sensitivity information, information concerning the amount of deviation between the AF sensor and an image pickup surface of the image pickup element 11, and information concerning the amount of movement of the focusing unit 2 with respect to a minimum amount of movement, which is detected in the movement-amount detector 4.

The lens information is transmitted in advance to the lens microcomputer 7 via the contact unit 18, and is stored in an internal memory of the lens microcomputer 7. The lens microcomputer 7 transmits necessary information to the camera body 10 in response to a data transmission request from the camera microcomputer 15.

The light measurement unit 16 detects light reflected from the object, and outputs the result to the camera microcomputer 15. The camera microcomputer 15 functions as an exposure time control unit, and determines an appropriate aperture value and shutter speed according to a current shooting mode of the camera body 10, such as a continuous-shooting mode, a single-shooting mode, a portrait-shooting mode, or a sport-shooting mode. The ISO speed rating adjustment function unit 14 sets an ISO speed rating according to the result output from the light measurement unit 16 and the determined shutter speed.

For example, when it is determined that the determined shutter speed is too low so that camera shake may occur, a high ISO speed rating, i.e., a high amplification factor, is set and a shutter speed is set again according to the high ISO speed rating. The ISO speed rating may be automatically set by the camera body 10 or may be set by a user in a manual shooting mode.

When the switch is pressed by the stroke S2, the camera microcomputer 15 initiates a release sequence operation. First, the camera microcomputer 15 transmits aperture value data and an aperture operation start instruction to the lens microcomputer 7. Upon receiving the aperture value data and the aperture operation start instruction from the camera microcomputer 15, the lens microcomputer 7 activates the aperture unit to adjust the value of the aperture unit to that specified by the received aperture value data.

A shutter blade (not shown) is opened under the control of the camera microcomputer 15, and the light reflected from the object is projected onto the image pickup element 11.

After a lapse of time corresponding to the set shutter speed, the shutter blade is closed and the light reflected from the object is blocked from entering.

Then, data output from the image pickup element 11 is converted into digital data by the A/D converter 12, and is stored in the memory 13. Thus, the release operation ends. After the release operation, the camera body 10 performs processing for displaying the image data stored in the memory 13.

FIG. 2 shows an example lens operation control table stored in advance in the internal memory of the lens microcomputer 7. The camera microcomputer 15 transmits noise tolerance data stored in an internal memory thereof, which is described below, and the determined ISO speed rating value to the interchangeable lens 1 via the contact unit 18.

The lens microcomputer 7 has stored therein the operation control table shown in FIG. 2, which includes the received noise tolerance data of the camera body 10, and determines what control to perform on the basis of the received ISO speed rating value.

For example, the camera body 10 has a noise tolerance of 100, which corresponds to Product A, and the set ISO speed rating is 400. In this case, a power consumption of 4 W and a speed of 50 rpm are defined in the operation control table. This means that the motor unit 3 has a rotation speed of up to 50 rpm and a lens power consumption of up to 4 W or less.

In another example, the camera body 10 has a noise tolerance of 100, which corresponds to Product A, and the set ISO speed rating is 50. In this case, there is no limit to the consumed power or the speed. It is assumed here that the maximum power consumption is 5 W.

In still another example, the camera body 10 has a noise tolerance of 100, which corresponds to Product A, and the set ISO speed rating is 6400. In this case, the consumed power or focus driving is limited. That is, the power consumption is prohibited, or the focus driving is stopped. Such limits to the consumed power or the speed or the stop of focus driving may not always be applied but may be applied only when the effect of noise exists.

The reason for such control is that if the ISO speed rating of the camera body 10 is set high, a captured image is more susceptible to magnetic noise from the motor unit 3 in the interchangeable lens 1 or voltage or current ripple noise generated by high power consumption.

Accordingly, if the ISO speed rating set by the camera body 10 is high, lens control is performed so that the generated noise components are reduced. Therefore, image data with less noise can be obtained.

The lens microcomputer 7 reads the speed of the motor unit 3 from the result of the movement-amount detector 4. The lens microcomputer 7 further reads a voltage value supplied from the camera body 10 on the basis of the result of the A/D converter 6. The lens microcomputer 7 determines the product of the read voltage value and a current value detected by a current detector (not shown) to calculate power consumption. As the rotation speed of a magnetic motor is reduced, the consumed power is also reduced. To reduce the consumed power, therefore, the rotation speed of the motor unit 3 is reduced.

The reason for determining power consumption in addition to the rotation speed of the motor unit 3 is as follows. If there is a limit only to the rotation speed of the motor unit 3, there is a risk of an application of maximum power when the motor is overloaded.

Furthermore, it is not economical for the current detector to detect a current due to the power consumed thereby. Thus, only the speed may be controlled unless there is a risk of overloading the motor. Further, current ripple noise is influenced by consumed current rather than power. For example, even under the same power consumption, the lower the voltage, the larger the amount of current consumed, resulting in an increase in ripple noise with increasing current. Thus, by detecting only the consumed current value, instead of detecting the power, a load for calculation processing of the lens microcomputer 7 can be reduced.

The term "noise tolerance" means strength against external noise. The larger a noise tolerance value, the higher the strength against noise. A noise tolerance is determined using a reference lens, which is adapted to measure noise, on the basis of a result obtained by relatively measuring a noise component.

Figures 3, 4:
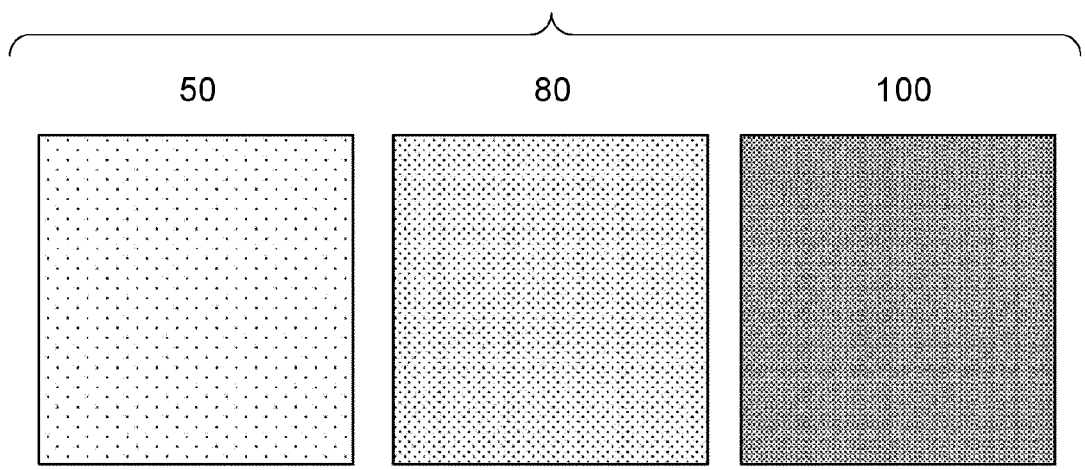
FIG. 3 is a diagram showing an example of a photographed image for each of camera types, according to an exemplary aspect of the present invention.
FIG. 4 is a diagram showing camera-status data, according to an exemplary aspect of the present invention.

FIG. 3 shows examples of the noise tolerance determined by setting the ISO speed rating to 100 and comparing photographed images of a dark object using the reference lens. If the tolerance of a camera which produces an image including no noise component is 100 (shown in the right in FIG. 3), the tolerance of a camera which produces an image including a few noise components is 80 (shown in the center in FIG. 3), and the tolerance of a camera which produces an image including more noise components is 50 (shown in the left in FIG. 3). Accordingly, the strength against noise is different depending on the type of camera. Ranks are assigned to cameras, and the lens control method can be changed according to the ranks.

Since Product A shown in FIG. 2 is not influenced by external noise at an ISO speed rating of 100, the noise tolerance is 100 and there is no power or speed limit at an ISO speed rating of 100. Product B has a noise tolerance of 80, and is more susceptible to noise components than Product A. Thus, as can be understood from the table shown in FIG. 2, the consumed power or speed for Camera product B is reduced compared with that for Product A even at the same ISO speed rating.

Noise tolerance data is transmitted to the lens microcomputer 7 together with an ISO speed rating. Thus, a lens control setting is changed according to the set ISO speed rating to allow more detailed control.

FIG. 4 is a diagram showing control states of the camera body 10, and camera-status data to be transmitted to the lens microcomputer 7 in association with the control states. In a non-operation state of the camera body 10 or a main-power off state as an example of a control state of the camera body 10, the camera-status data is set to 00 hex. In a release-in-progress state where the object is being illuminated by light, the camera-status data is set to 10 hex. In an A/D-conversion-in-progress state where data obtained by photographing is currently being A/D converted, the camera-status data is set to 11 hex. In a data-transfer-in-progress state where image data is currently being transferred to the internal memory of the lens microcomputer 7, the camera-status data is set to 12 hex.

Control with the above limits may not always be executed but may be executed only when a photographed image is influenced by external noise. This can minimize the number of disabled camera functions.

The camera microcomputer 15 communicates with the lens microcomputer 7 immediately when any of the states defined in the table shown in FIG. 4 is changed. The table shown in FIG. 4 defines a plurality of operation states of the camera body 10 that is performing image-related processing. During image data processing, which is more influenced by external noise, noise components superimposed on an image can be reduced as much as possible by applying control restrictions such as reducing the power consumed by the lens microcomputer 7 or delaying focus control.

If restrictions are always applied to control of the interchangeable lens 1, performance of a camera system is deteriorated. Thus, restrictions are applied only at the desired timing described above to maintain the performance of a camera system.

Accordingly, the camera microcomputer 15 transmits information defining the timing during the image data processing, the set ISO speed rating value, and the noise tolerance data of the camera body 10 to the lens microcomputer 7. The lens microcomputer 7 limits the power consumed by the interchangeable lens 1 or focus speed at the desired timing based on the received information in consideration of the noise resistance of the camera body 10 to which the interchangeable lens 1 is attached. The above-described devices or systems functionally operate, whereby a sharp image can always be obtained from the camera.

Figure 5:
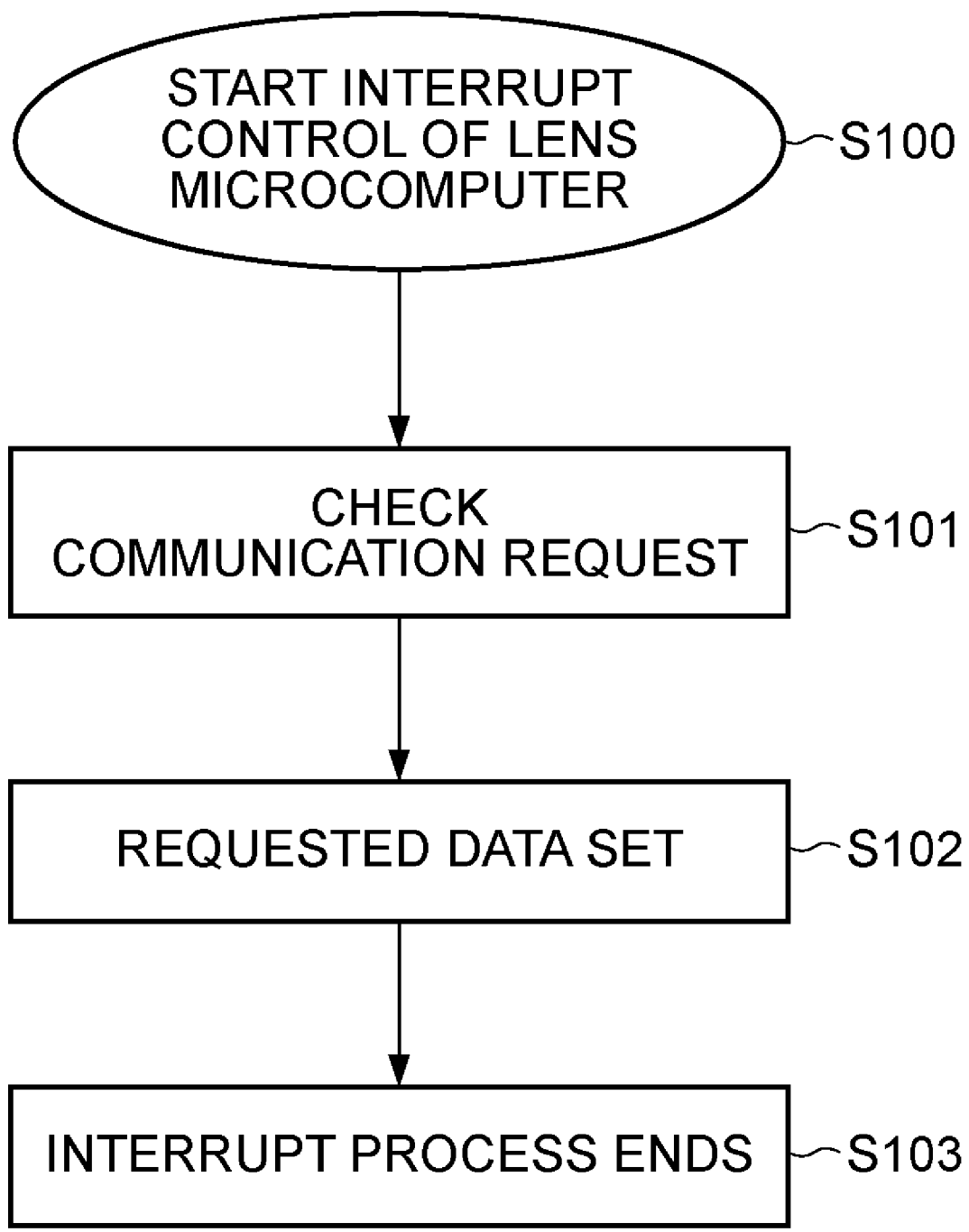
FIG. 5 is a flowchart showing an interrupt process of a lens microcomputer, according to an exemplary aspect of the present invention.

FIG. 5 is a flowchart showing a communication interrupt process of the lens microcomputer 7.

The camera microcomputer 15 and the lens microcomputer 7 are configured to first perform bidirectional communication with each other. In step S100, the lens microcomputer 7 executes a communication interrupt process in response to communication from the camera microcomputer 15.

In step S101, upon receiving a command transmitted from the camera microcomputer 15 via the contact unit 18, the lens microcomputer 7 immediately analyzes the command and determines a next operation.

The command includes code data indicating a request sent from the camera microcomputer 15 to the lens microcomputer 7. The code data and content to be communicated are determined in advance by the camera body 10 and the interchangeable lens 1 so as to establish communication therebetween. The lens microcomputer 7 analyzes the command including the code data to identify the request sent from the camera body 10.

Examples of the command include information relating to the driving of the motor mounted in the interchangeable lens 1, such as an instruction that instructs the focusing unit 2 to move, a request for reception of the amount of movement of the focusing unit 2, an instruction that instructs the focusing unit 2 to stop moving, an instruction that instructs the driving of the aperture, and a request for reception of the amount of driving of the aperture.

The examples of the command further include a request for transmission of optical information such as focal length, sensitivity, AF error information, F number, and lens status information, and camera information such as a request for reception of noise tolerance data, a request for reception of an ISO speed rating value, and information concerning a camera status operation state of the camera body 10.

In step S102, if a reception request is identified as a result of the analysis of the command data, the lens microcomputer 7 stores in the internal memory, as received data, information that is transmitted from the camera microcomputer 15 in the next communication. If a request for transmission of information is identified as a result of the analysis of the command data, the lens microcomputer 7 transmits the data requested by the camera microcomputer 15 to the camera microcomputer 15. If an instruction to permit the driving of a certain unit or units is identified as a result of the analysis, the lens microcomputer 7 immediately starts the driving of the unit or units.

After the processing of step S102 has been completed, in step S103, the communication interrupt process ends.

Figure 6:
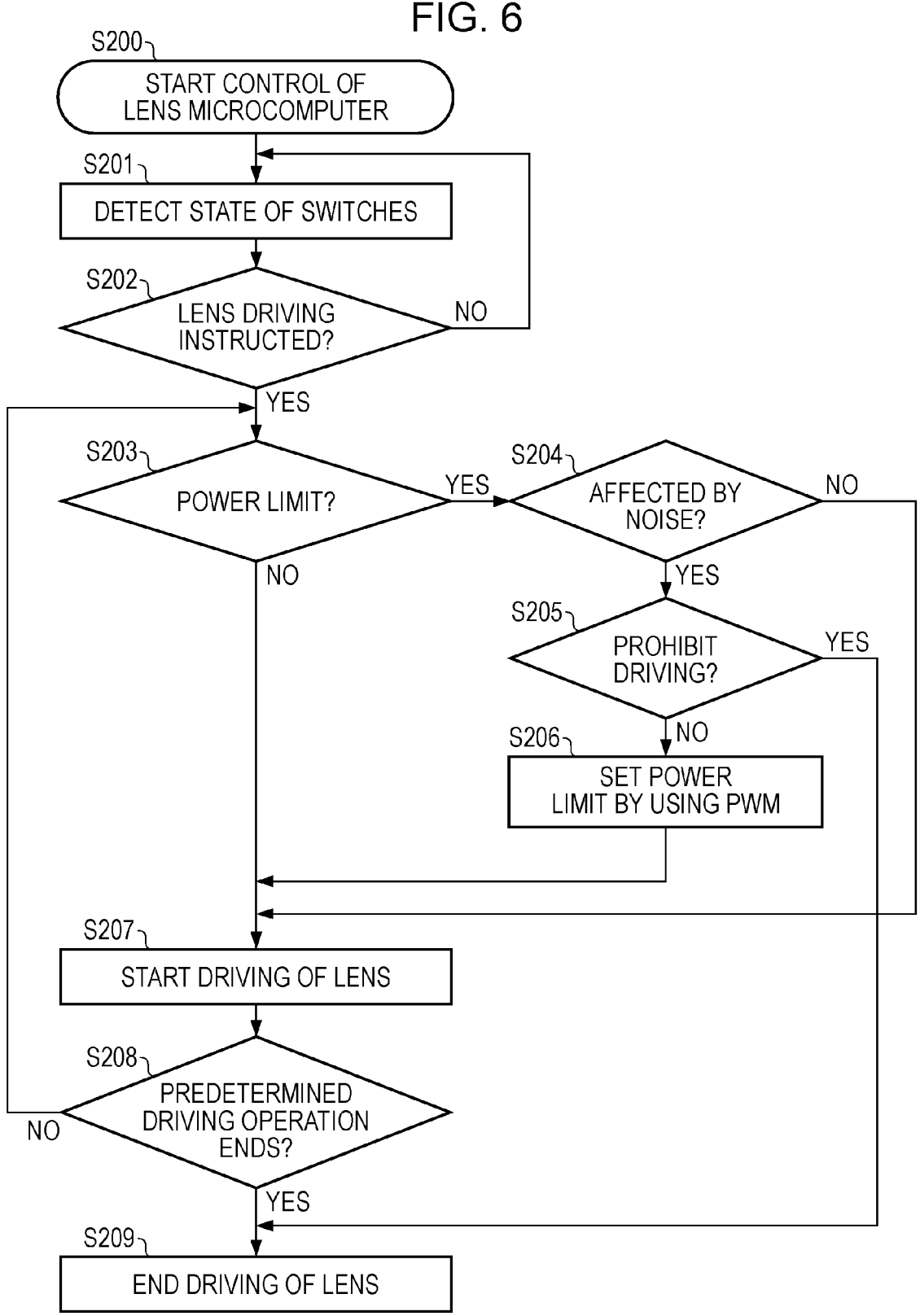
FIG. 6 is a flowchart showing a standard process of the lens microcomputer, according to an exemplary aspect of the present invention.

FIG. 6 is a flowchart showing an example program for various types of control of the lens microcomputer 7 according to the embodiment.

In step S200, the interchangeable lens 1 is attached to the camera body 10 and a power supply voltage is applied to the lens microcomputer 7 via the contact unit 18.

The power supply voltage is connected to the motor unit 3, the movement-amount detector 4, and the lens microcomputer 7. The A/D converter 6 in the lens microcomputer 7 is used to monitor a power supply voltage supplied from the camera body 10 and a voltage supplied to the motor unit 3, and to calculate the power and current consumed by the motor.

In step S201, the lens microcomputer 7 detects the states of switches mounted on the exterior of the interchangeable lens 1, and stores the results in the internal memory. The switches include, for example, a switch for switching between two operation modes, namely, autofocus and manual focus modes, and switches that provide zoom position information and position information of the focusing unit 2.

In step S202, the lens microcomputer 7 determines whether or not the driving of the focusing unit 2 is permitted to start on the basis of the command data from the camera microcomputer 15. That is, as described with reference to FIG. 5, it is determined whether or not an instruction that instructs the focusing unit 2 to move or a request for reception of the amount of movement of the focusing unit 2 has been transmitted in the command communication from the camera body 10. If none of such an instruction or request has been transmitted, the process returns to step S201.

In step S203, the lens microcomputer 7 compares the noise tolerance data and ISO speed rating value received in advance from the camera microcomputer 15 with the operation control table described with reference to FIG. 2 to determine whether or not a power limit or a focus speed limit is necessary. If it is determined that a power limit is necessary, the process proceeds to step S204, otherwise to step S207.

In step S204, the lens microcomputer 7 determines whether or not the current state of the camera body 10 is any of the states described with reference to FIG. 4, i.e., the release-in-progress state, the A/D-conversion-in-progress state, and the data-transfer-in-progress state, on the basis of the state information of the camera body 10 received in advance from the camera microcomputer 15 in order to determine whether or not the effect of noise exists. If it is determined that the current state of the camera body 10 is none of the states, the process proceeds to step S207.

In the determination in step S204, during image data processing of the camera body 10, the power consumed by the interchangeable lens 1 is reduced as much as possible, and the consumed power is limited to reduce magnetic noise incoming from the motor or the motor is controlled to operate at a low speed. During any other state of the camera body 10, on the other hand, some of the settings of the interchangeable lens 1 are limited or not limited depending on the timing so that the performance of a camera system may not be deteriorated.

In step S205, the lens microcomputer 7 refers to the operation control table shown in FIG. 2 and determines whether or not the limit determined in step S203 indicates the prohibition of the power consumption or focus driving. If it is determined that the limit indicates the prohibition, the process proceeds to step S209, in which the lens microcomputer 7 prohibits the focusing driving and reduces the consumed power regardless of the instruction that instructs the focusing unit 2 to move, which is received from the camera body 10.

In step S206, the lens microcomputer 7 determines a maximum PWM value to be applied to the motor on the basis of the power supply voltage currently supplied from the camera body 10 and on the basis of the limit of power consumption determined in step S203 in order to limit the power consumed by the motor, and outputs the result from the PWM generation circuit 5.

Normally, the lens microcomputer 7 performs speed control of the motor unit 3 without such a limit. Depending on the state of the camera body 10, which is determined in step S204, however, the lens microcomputer 7 restricts the maximum PWM value to reduce the consumed power. Since the maximum PWM value is restricted, the motor operates at a low speed.

In step S207, the lens microcomputer 7 performs control to apply a voltage to the motor in the motor unit 3 to start driving of the motor. As the motor unit 3 is driven, the focusing unit 2 also starts to move. According to the output from the movement-amount detector 4, the speed is controlled and the amount of movement is detected.

In step S208, the lens microcomputer 7 controls the speed while detecting the output of the movement-amount detector 4, and determines whether or not a predetermined amount of driving is reached. If the predetermined amount of driving is not reached, the process returns to step S203. Since the process returns to step S203, even if the state of the camera microcomputer 15 is suddenly changed, the lens microcomputer 7 can immediately change the maximum PWM value to thereby reduce the consumed power even during the driving of the focusing unit 2.

In step S209, since the predetermined amount of driving is reached, the lens microcomputer 7 stops the driving of the motor unit 3, and also stops the driving of the focusing unit 2.

Figure 7:
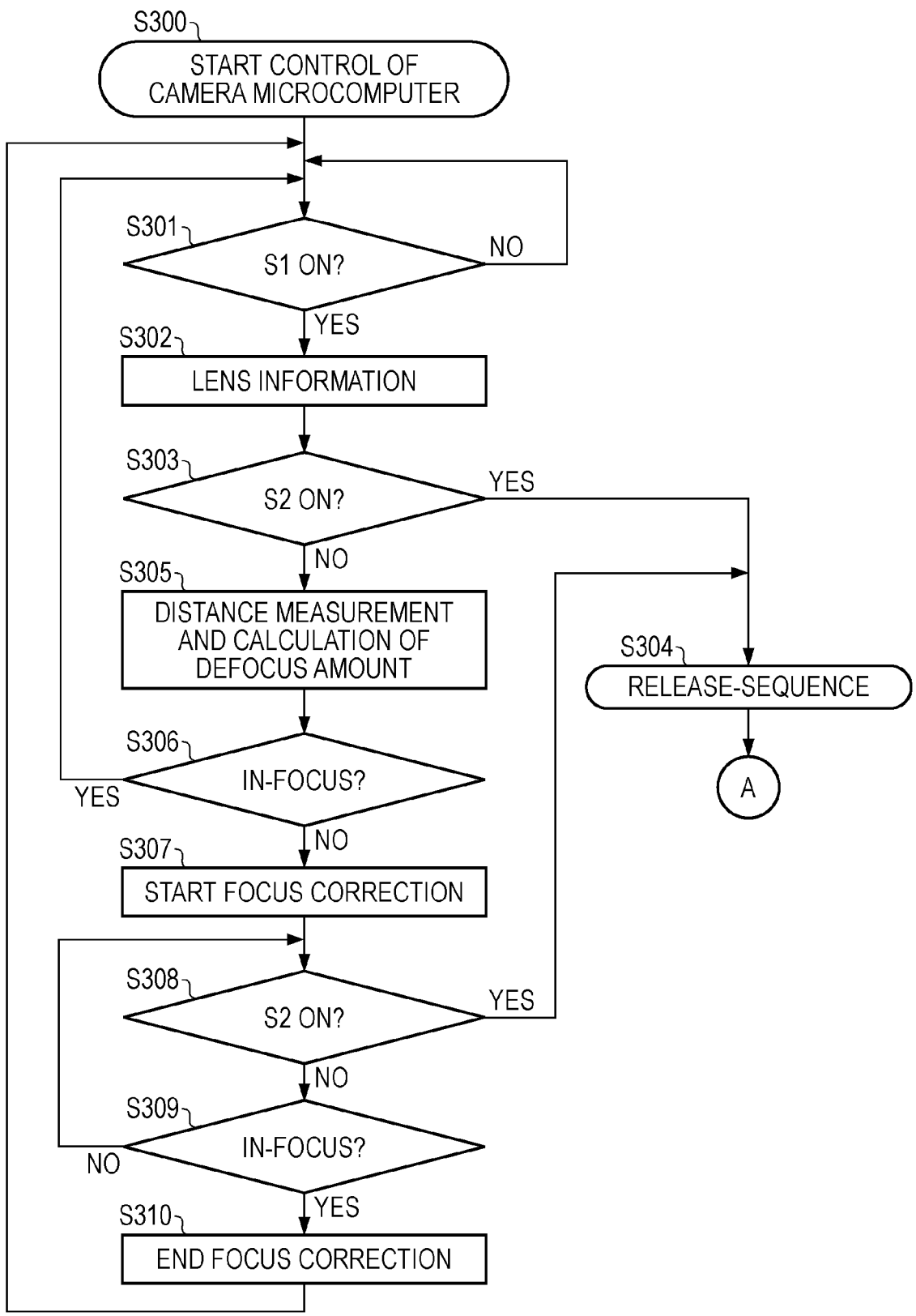
FIG. 7 is a flowchart showing an example sequence operation of a camera microcomputer, according to an exemplary aspect of the present invention.

FIG. 7 is a flowchart showing an example sequence operation of the camera microcomputer 15.

In step S300, the camera microcomputer 15 of the camera body 10 starts its operation.

In step S301, the camera microcomputer 15 determines whether or not the release button is pressed by the stroke S1 (half press state). If the release button is not pressed by the stroke S1, the determination is performed again. If the release button is pressed by the stroke S1, the process proceeds to step S302.

In step S302, since the release button is pressed by the stroke S1, the camera microcomputer 15 transmits a command corresponding to a request for transmission of various data relating to AF calculation to the lens microcomputer 7.

Upon receiving the command, the lens microcomputer 7 immediately transmits the requested data to the camera microcomputer 15. The camera microcomputer 15 stores the received lens data in the internal memory. The data relating to AF calculation includes status information of the interchangeable lens 1, sensitivity, the amount of deviation between the AF sensor and a film or an image pickup surface of the image pickup element 11, the amount of movement of the focusing unit 2 with respect to a minimum amount of movement, which is detected in the movement-amount detector 4.

Then, the camera microcomputer 15 sends an instruction to the distance measurement unit 17 to start distance measurement, and the distance measurement unit 17 accumulates in the image pickup element 11 the light incident on the AF sensor.

The camera microcomputer 15 also sends an instruction to the light measurement unit 16 to start light measurement, and the light measurement unit 16 detects the amount of light incident on a light measurement sensor.

In step S303, the camera microcomputer 15 detects the state of the release button, and determines whether or not the release button is pressed by the stroke S2 (full press state). If the release button is not pressed by the stroke S2, the process proceeds to step S305. If the release button is pressed by the stroke S2, the process proceeds to step S304.

In step S304, the camera microcomputer 15 executes a release sequence operation, which is performed in an object-shooting mode, and proceeds to step S401 of a flowchart shown in FIG. 8, which is described below.

In step S305, the camera microcomputer 15 calculates the amount of defocus to the object using the output value of the distance measurement unit 17 obtained in step S302. Then, the camera microcomputer 15 converts the amount of defocus into the amount of deviation in position of the focusing unit 2 on the basis of the information relating to AF calculation obtained from the lens microcomputer 7.

In step S306, if the amount of deviation in position of the focusing unit 2 is zero as a result of the calculation in step S305, this means an in-focus state. Thus, it is determined that position correction of the focusing unit 2 is not necessary, and the process returns to step S301.

If it is determined in step S306 that position correction of the focusing unit 2 is necessary, in step S307, the camera microcomputer 15 transmits to the lens microcomputer 7 an instruction that instructs the focusing unit 2 to move and a request for reception of the amount of movement of the focusing unit 2. After transmitting a command corresponding to the instruction and the request, the camera microcomputer 15 further transmits amount-of-movement information. In response to the command communication, the lens microcomputer 7 starts to control the driving of the motor unit 3.

In step S308, the camera microcomputer 15 determines whether or not the release button is pressed by the stroke S2 (full press state). If the release button is not pressed by the stroke S2, the process proceeds to step S309. If the release button is pressed by the stroke S2, the process proceeds to step S304. This routine is executed by the interchangeable lens 1 during the movement of the focusing unit 2.

Also in this case, it is always monitored whether or not the release button is pressed by the stroke S2 to allow transition to the release sequence operation even when the user is moving the focus.

In step S309, the camera microcomputer 15 sends a command corresponding to a request for transmission of lens status information indicating the current state of the interchangeable lens 1 to the lens microcomputer 7.

Upon receiving the command, the lens microcomputer 7 immediately transmits the lens status information to the camera microcomputer 15.

The lens status information communicated to the camera microcomputer 15 includes states necessary for sequence control of the camera, which are stored in the internal memory of the lens microcomputer 7, such as a state indicating that the driving of the motor unit 3 is in progress, a state indicating that the driving of aperture is in progress, or states of various switches.

In this example, the camera microcomputer 15 determines whether or not the driving of the motor unit 3 is in progress. If the motor unit 3 is not in operation, it is determined that the object is in focus, and the process proceeds to step S310. If the driving of the motor unit 3 is in progress, the process proceeds to step S308.

In step S310, the camera microcomputer 15 determines that the correction operation has been completed, that is, the camera microcomputer 15 determines that the object is in focus. Then, the process proceeds to step S301.

Figure 8:
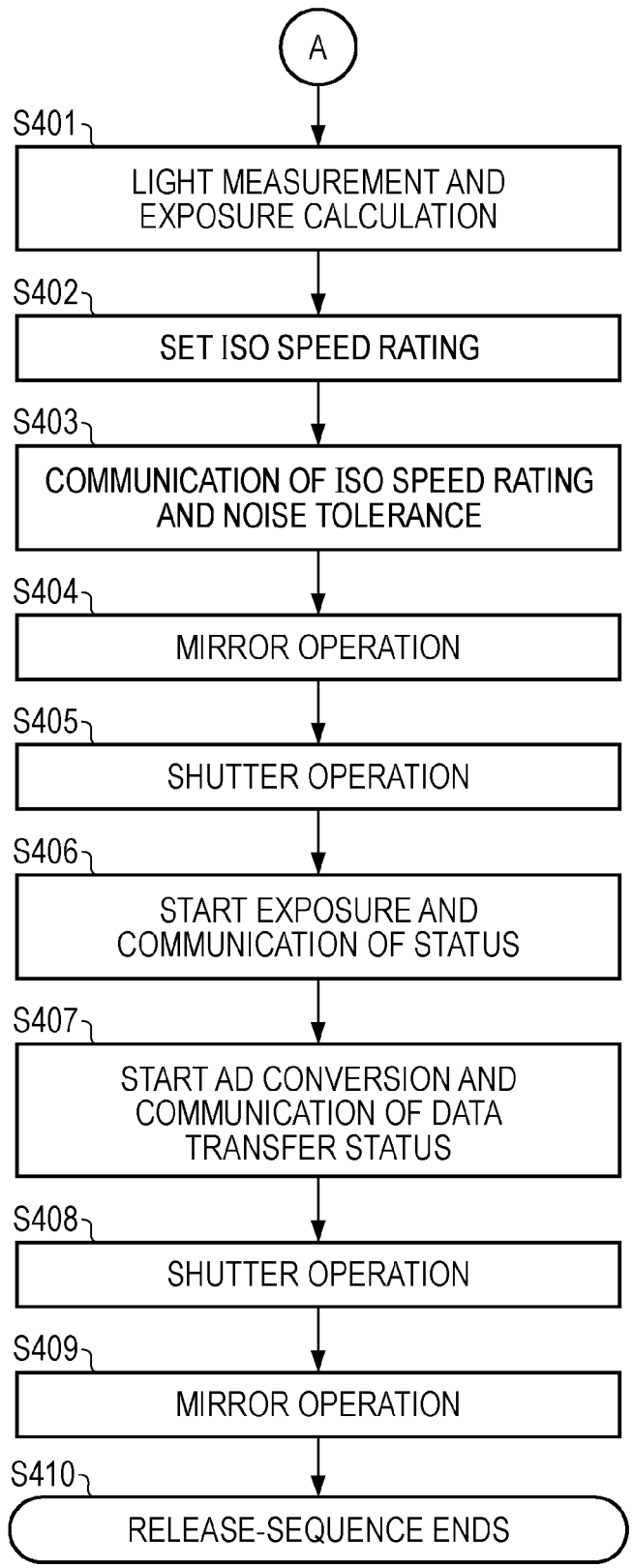
FIG. 8 is a flowchart showing an example release sequence operation of the camera microcomputer, according to an exemplary aspect of the present invention.

FIG. 8 is a flowchart showing the release sequence operation of the camera microcomputer 15, which is executed after the processing of step S304 shown in FIG. 7.

In step S401, since it is determined in step S303 or S308 shown in FIG. 7 that the release button is pressed by the stroke S2, the camera microcomputer 15 outputs an instruction to the light measurement unit 16 to start light measurement in order to perform a photographing operation.

The light measurement unit 16 detects the amount of light reflected from the object which is incident on the light measurement sensor. Then, the light measurement unit 16 determines an aperture value and shutter speed, which are necessary for photographing by the camera body 10, on the basis of the detected result.

As is known in the art, if the shutter speed determined in step S401 is too low and the exposure time is too long, camera shake may occur, and the photographed image may be blurred.

Thus, in step S402, an optimum aperture value and an optimum shutter speed are determined again, and the ISO speed rating is increased if it is determined that a dark image with an insufficient amount of light will be obtained by exposure.

In step S403, the camera microcomputer 15 transmits the ISO speed rating value determined in step S402 and a command corresponding to a request for reception of the noise tolerance data stored in advance in the internal memory to the lens microcomputer 7 via the contact unit 18. Then, the corresponding data is transmitted.

In step S404, the camera microcomputer 15 starts to move up a mirror that is located in front of a shutter (not shown) before the start of exposure operation.

In step S405, the camera microcomputer 15 starts to open the shutter before the start of exposure operation.

In step S406, the camera microcomputer 15 changes the camera status information indicating the operation state of the camera body 10 during the releasing operation, and transmits a command corresponding to a request for reception of the data, followed by the status data, to the lens microcomputer 7. Then, the camera microcomputer 15 starts exposure of the image pickup element 11.

In step S407, after a lapse of an exposure time corresponding to the predetermined shutter speed, the camera microcomputer 15 changes the camera status information to the A/D-conversion-in-progress state, and transfers exposure information to the A/D converter 12. When the A/D conversion is completed, the camera microcomputer 15 changes the camera status information to the data-transfer-in-progress state, and stores the digital information in the memory 13.

The camera status information described above is merely an example, and may be different depending on the camera sequence or an image pickup element other than a CCD sensor, such as a complementary metal oxide semiconductor (CMOS) sensor. In such a case, the amount of information or the number of information types may be increased or decreased as necessary.

In step S408, the camera microcomputer 15 starts to close the shutter before the termination of exposure operation.

Since the exposure operation is terminated, in step S409, the camera microcomputer 15 starts to move down the mirror located in front of the shutter. In step S410, the camera microcomputer 15 ends the release sequence operation.

This embodiment is also applicable to apparatuses in which the camera body 10 and a lens are integrated, such as a digital camera and a digital video camera recorder. In such cases, control can be performed using a single microcomputer, and no functions relevant to communication, which are described in the embodiment, are required. In the embodiment, therefore, the communication interrupt process of the lens microcomputer 7 shown in FIG. 5 can be omitted, which is advantageous for simplifying firmware processing.

In the embodiment, it is assumed that the focus speed and the power consumed thereby are limited. However, any other parameter which allows a reduction in the consumed power may be used.

For example, power consumed by a microcomputer or a peripheral circuit structure may be reduced, or even in a case where a magnetic motor is used for operating an aperture (not shown), similar processing may be performed. By adding such processing, power consumption can further be reduced.

In the present invention, therefore, a method of controlling a lens is changed according to noise resistance of each type of camera so as to accord with the ISO speed rating or state of the camera. This provides high-quality image data with less noise while preventing degradation in performance of a camera system.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-105453 filed Apr. 13, 2007, which is hereby incorporated by reference herein in its entirety.

What is claimed is:

1. An optical apparatus comprising:
    an image pickup unit including an image pickup element, the image pickup unit configured to obtain a photoelectrically converted output corresponding to an object image formed on a surface of the image pickup element;
    an exposure time control unit configured to control an exposure time of the image pickup element;
    a sensitivity adjustment function unit configured to set an ISO speed rating value of the image pickup element, the ISO speed rating value corresponding to an amplification factor of the photoelectrically converted output;
    a lens unit including a plurality of elements to be electrically driven and configured to form the object image on the surface of the image pickup element; and
    a control changing unit configured to control the plurality of electrical elements of the lens unit,
    wherein when the image pickup unit is performing photoelectrical conversion or is processing photoelectrically converted data, a method of controlling at least one of the elements of the lens unit is changed so as to reduce power consumption according to the ISO speed rating value set by the sensitivity adjustment function unit.

2. The optical apparatus according to claim 1, wherein the control changing unit includes noise tolerance data of the image pickup unit indicating strength against external noise, and is configured to change a method of controlling at least one of the elements of the lens unit according to the noise tolerance data.

3. The optical apparatus according to claim 1, wherein the optical apparatus further includes a camera section which includes the image pickup unit,
    wherein the camera section and the lens unit are configured to communicate with each other.

4. The optical apparatus according to claim 3, wherein the camera section further includes a communication unit configured to transmit to the lens unit at least one of noise tolerance data indicating strength against external noise, the ISO speed rating value data set by the sensitivity adjustment function unit, and output data output from the exposure time control unit,
    wherein the lens unit includes the control changing unit, and upon receiving the data transmitted from the communication unit of the camera section, the control changing unit is configured to change a method of controlling the lens unit on the basis of the received data.

5. The optical apparatus according to claim 4,
    wherein the control changing unit is configured to change a method of controlling the lens unit so as to reduce power consumption of the lens unit according to the received data.

6. The optical apparatus according to claim 1,
    wherein the control changing unit is configured to change a method of controlling the lens unit only when the ISO speed rating value is larger than a predetermined value.

7. The optical apparatus according to claim 1, wherein when the image pickup element is performing photoelectrical conversion or is transferring photoelectrically converted data to an internal memory device, the control changing unit changes a method of controlling the lens unit depending on the exposure time.

8. The optical apparatus according to claim 2,
    wherein strength, against external noise, of a camera body to which the lens unit is attached is determined on the basis of the noise tolerance data, and
    wherein when it is determined that the determined strength is smaller than a set value, the control changing unit changes a method of controlling the lens unit.

9. The optical apparatus according to claim 2, wherein the optical apparatus further includes a camera section including the image pickup unit,
    wherein the camera section and the lens unit are configured to communicate with each other.

10. An optical apparatus comprising:
    an image pickup unit configured to obtain a photoelectrically converted output corresponding to an object image formed on a surface of an image pickup element;
    an exposure time control unit configured to control an exposure time of the image pickup element;
    a sensitivity adjustment function unit configured to set an ISO speed rating value corresponding to an amplification factor of the photoelectrically converted output obtained by the image pickup unit;
    a storage unit configured to store noise tolerance data indicating strength against external noise;
    a lens unit including a plurality of elements to be electrically driven and configured to form the object image on the surface of the image pickup element; and
    a communication unit configured to communicate with the lens unit to transmit information to the lens unit, the information including the ISO speed rating value set by the sensitivity adjustment function unit, an output value of the exposure time control unit, and the noise tolerance data,
    wherein the lens unit includes a changing unit configured to change a method of controlling the lens unit on the basis of the information received by the lens unit.

* * * * *